(12) United States Patent
Singh (10) Patent No.: US 8,675,994 B1
(45) Date of Patent: Mar. 18, 2014

(54) HIGH PERFORMANCE WARP CORRECTION IN TWO-DIMENSIONAL IMAGES

(75) Inventor: Manish K. Singh, Tracy, CA (US)

(73) Assignee: Ambarella, Inc., Santa Clara, CA (US)

( * ) Notice: Subject to any disclaimer, the term of this patent is extended or adjusted under 35 U.S.C. 154(b) by 764 days.

(21) Appl. No.: 12/817,414

(22) Filed: Jun. 17, 2010

(51) Int. Cl.
G06K 9/36 (2006.01)
G06K 9/32 (2006.01)
G06T 11/00 (2006.01)
G06T 3/40 (2006.01)

(52) U.S. Cl.
USPC ............ 382/293; 382/276; 382/298; 382/299

(58) Field of Classification Search
USPC .................................. 382/276, 293, 298, 299
See application file for complete search history.

(56) References Cited

U.S. PATENT DOCUMENTS

| | | | |
|---|---|---|---|
| 5,204,944 A * | 4/1993 | Wolberg et al. ................ 345/427 |
| 5,594,676 A * | 1/1997 | Greggain et al. ............. 708/300 |
| 5,847,711 A * | 12/1998 | Kaufman et al. .............. 345/424 |
| 6,611,260 B1 * | 8/2003 | Greenberg et al. ............ 345/204 |
| 6,724,948 B1 * | 4/2004 | Lippincott ...................... 382/298 |
| 7,379,623 B2 * | 5/2008 | Rudolph ......................... 382/293 |
| 7,411,628 B2 * | 8/2008 | Tian et al. ...................... 348/581 |
| 8,482,573 B2 * | 7/2013 | Mallett .......................... 345/531 |
| 2003/0058368 A1 * | 3/2003 | Champion ..................... 348/581 |
| 2006/0050083 A1 * | 3/2006 | Lachine et al. ................ 345/611 |
| 2010/0054628 A1 * | 3/2010 | Levy et al. ..................... 382/284 |

* cited by examiner

*Primary Examiner* — Matthew Bella
*Assistant Examiner* — Jose M Torres
(74) *Attorney, Agent, or Firm* — Christopher P. Maiorana, PC (57) ABSTRACT

An apparatus generally having a first memory, a second memory and a circuit is disclosed. The first memory may be configured to store a warp table. The warp table is generally accessed through a single data port of the first memory. The second memory may be configured to buffer an input image. The input image may have a plurality of input pixels arranged in two dimensions. The circuit may be configured to generate an output image by a warp correction of an input image. The warp correction may be defined by the warp table. The output image may include a plurality of output pixels. At least one of the output pixels maybe generated during each clock cycle of the circuit.

18 Claims, 9 Drawing Sheets

HIGH PERFORMANCE WARP CORRECTION IN TWO-DIMENSIONAL IMAGES

FIELD OF THE INVENTION

The present invention relates to a method and/or architecture for image processing generally and, more particularly, to a high performance warp correction in two-dimensional images.

BACKGROUND OF THE INVENTION

Camera image processing uses a warp correction system to correct for warping in an input image. Warp correction is a mapping of a pixel in an output image to a pixel in the input image. The mapping is defined by a two-dimensional (2D) warp field that depends on the optical characteristics of the lens and a zoom factor. Conventionally, the warp field is computed for a camera design and stored in 2D tables of an actual camera. Since the table entry spacing covers more than a single pixel, 2D bilinear interpolation is used to calculate the warp field at the missing pixels. The warp field spans hundreds of lines across the input image and so a large buffer space is used to hold sufficient input image data. Management of the buffer is based on a minimum warp field calculated across a next pixel line. Conventional approaches hold the warp field in either a 5-ported memory or 5 memory banks to achieve a single pixel per clock performance.

It would be desirable to achieve the single pixel per clock performance with a single-ported memory.

SUMMARY OF THE INVENTION

The present invention concerns an apparatus generally having a first memory, a second memory and a circuit. The first memory may be configured to store a warp table. The warp table is generally accessed through a single data port of the first memory. The second memory may be configured to buffer an input image. The input image may have a plurality of input pixels arranged in two dimensions. The circuit may be configured to generate an output image by a warp correction of an input image. The warp correction may be defined by the warp table. The output image may include a plurality of output pixels. At least one of the output pixels maybe generated during each clock cycle of the circuit.

The objects, features and advantages of the present invention include providing a high performance warp correction in 2-dimensional images that may (i) achieve a single output pixel per clock performance, (ii) store a warp field in a single-port memory, (iii) read fewer warp table entries than conventional techniques for interpolation calculations, (iv) compute interpolation parameters in advance of warping an input image, (v) utilize pipelining and chaining of the interpolation parameters, (vi) compute warp fields at every pixel using the adders instead of multipliers and/or (vii) achieve a small hardware cost while maintaining high performance compared with conventional designs.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Some embodiments of the present invention may concern an apparatus having a single-ported memory, multiple (e.g., 4) stages of a process pipeline, an arbitration logic, an input tile buffer and an output tile buffer. The single-ported memory generally holds a two-dimensional (2D) warp field. The input tile buffer may be configured to hold multiple input tiles. An on-chip memory or an off-chip memory may store a partial image. An initial stage of a circuit may be configured to compute a minimum warp field across a pixel line. The next stage of the circuit may be configured to compute a warp field at specific points. Another stage of the circuit is generally configured to fetch the input tiles from the image buffer. A subsequent stage of the circuit may be configured to calculate a warp field at every output pixel point and compute output pixels from the fetched input tile. All stages of the circuit generally work in a pipelined fashion to achieve a high performance circuit. Access to the warp table may be arbitrated between the two front-end stages by the arbitration logic. A later of the front-end stages generally reads several (e.g., 4) warp table entries where an initial output tile is being generated. The later stage may read a few (e.g., 2) warp table entries where other output tiles are being generated. Since grid spacing in the warp field usually covers many pixels, the initial stage may utilize several clock cycles to access the appropriate warp table entries.

Figure 1:
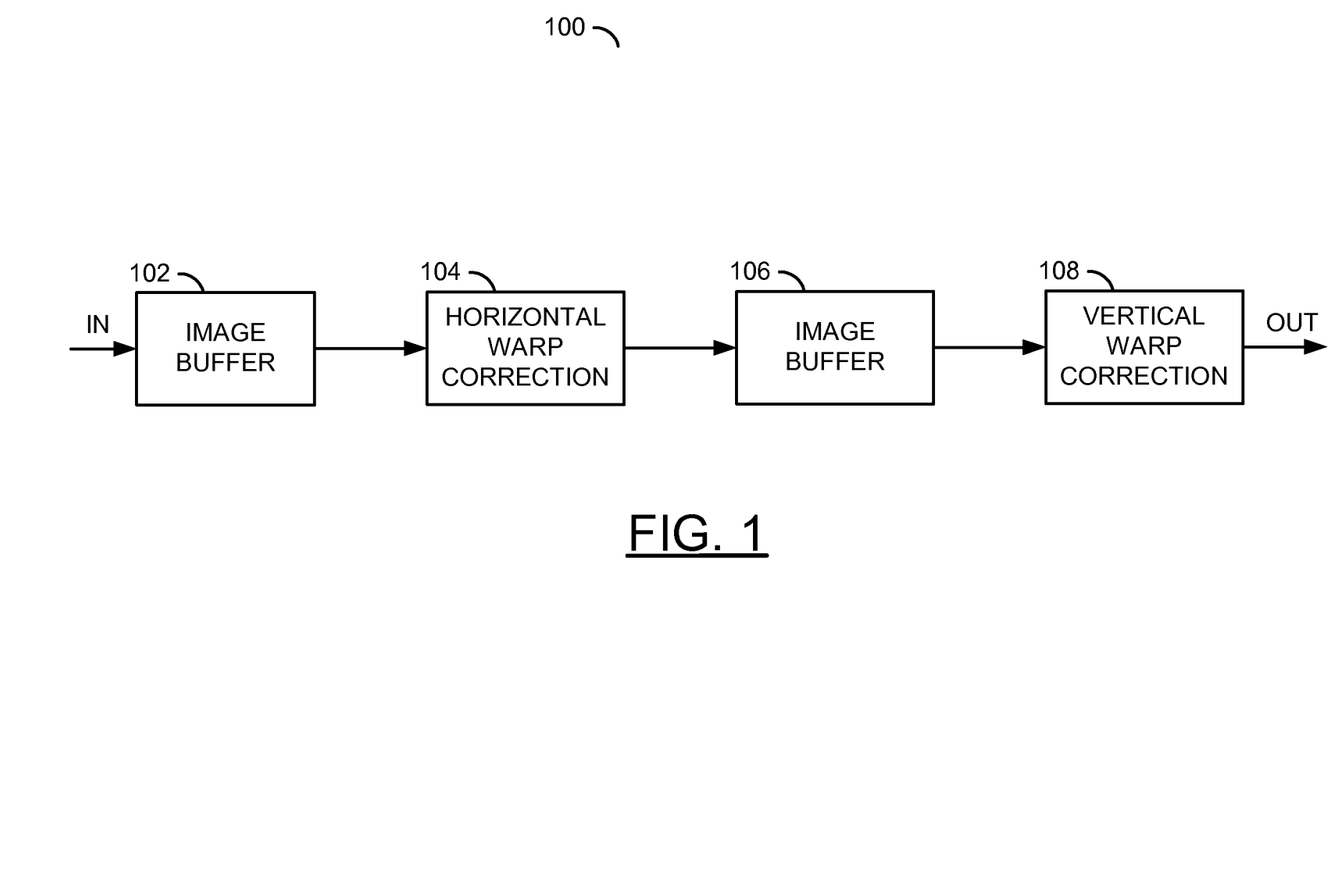
FIG. 1 is a block diagram of an example method for warp correction in two-dimensional images.

Referring to FIG. 1, a block diagram of an example method 100 for warp correction in 2D images is shown. The method (or process) 100 generally comprises a step (or block) 102, a step (or block) 104, a step (or block) 106, a step (or block) 108. The steps 102 to 108 may be implemented in hardware, software, firmware or any combination thereof in an apparatus.

In the step 102, one or more portions of an input image within a signal (e.g., IN) may be buffered in an image buffer. From the image buffer, a warp correction along a horizontal direction may be performed on an input image portion in the step 104. Operations of the step 104 may generate an intermediate image portion. The step 104 may be implemented in a unit (or circuit) of the apparatus referred to as a horizontal warp correction unit. In the step 106, the intermediate image portion may be buffered in another image buffer. In some embodiments, both image buffers may reside within a common memory device in different addressable regions. In other embodiments, each image buffer may reside in a separate memory. The step 108 generally performs another warp correction in a vertical direction on the intermediate image portion to generate a corresponding portion of an output image in a signal (e.g., OUT). The step 108 may be implemented by a unit (or circuit) of the apparatus referred to as a vertical warp correction unit. In some embodiments, the horizontal warp correction unit and the vertical warp correction unit may be the same unit within the apparatus. The horizontal warp correction unit generally works on horizontal components of a warp field and thus achieves warp correction in the horizontal direction. The vertical warp correction unit may work on vertical components of the warp field and thus achieve warp correction in the vertical direction.

Figure 2:
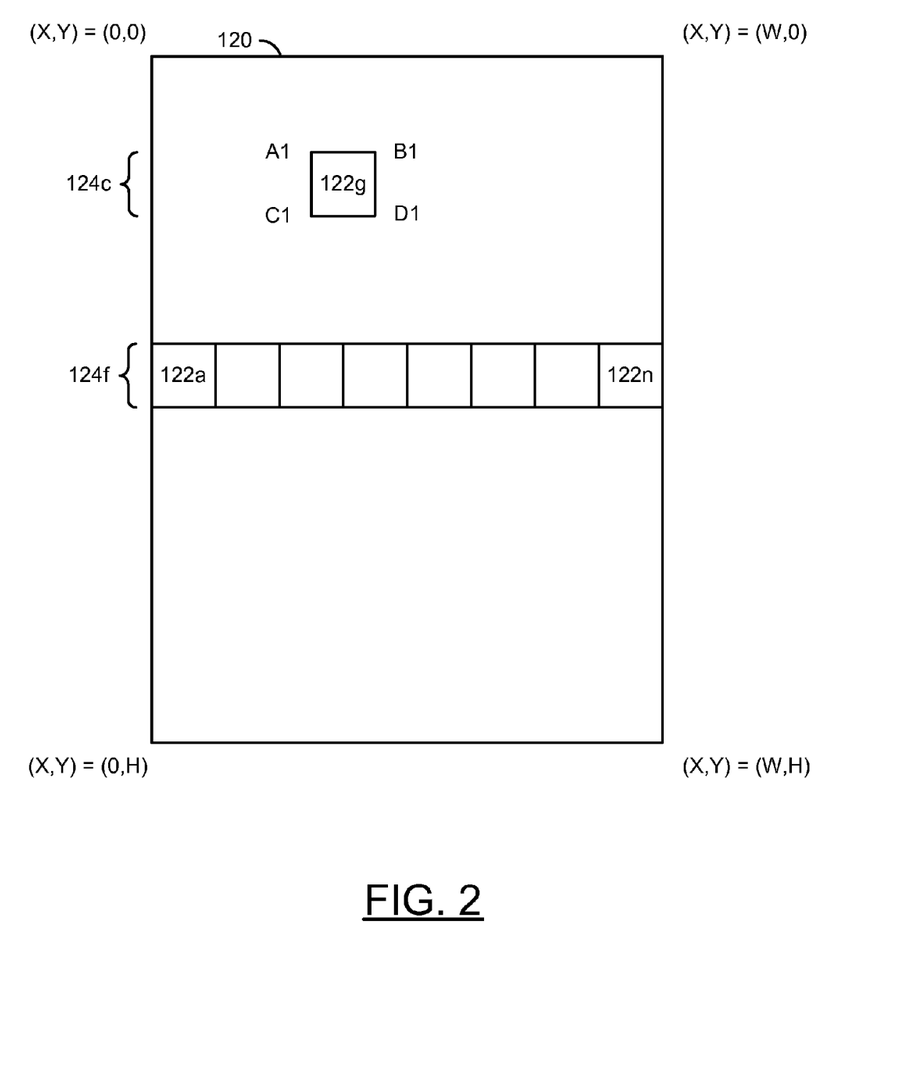
FIG. 2 is a diagram of an example two-dimensional image.

Referring to FIG. 2, a diagram of an example 2D image 120 is shown. The image (or region) 120 may have a height (e.g., H) and a width (e.g., W). The image 120 may represent an input image or an output image. The height H may be a distance between (i) an upper-left corner (e.g., (X,Y)=(0,0)) and a lower-left corner (e.g., (X,Y)=(0,H) of the image 120 and/or (ii) an upper-right corner (e.g., (X,Y)=(W,0)) and a lower-right corner (e.g., (X,Y)=(W,H) of the image 120. The width W may be a distance between the upper-left corner and the upper-right corner of the image 120 and/or the lower-left corner and the lower-right corner of the image 120.

The image 120 is generally divisible into multiple tiles (or subregion) 122a-122n. Each tile 122a-122n may be a rectangle. Tiles 122a-122n in an input image may be referred to as input tiles. The tiles 122a-122n in the intermediate image may be referred to as intermediate tiles. Tiles 122a-122n in an output image may be referred to as output tiles.

The tiles 122a-122n may be arranged in one or more tile rows 124a-124k (only rows 124c and 124f are shown for clarity). Each input tile 122a-122n may comprise a 2D array of input pixels. Each intermediate tile 122a-122n may comprise a 2D array of intermediate pixels. Each output tile 122a-122n may comprise a 2D array of output pixels. By way of example, a particular tile (e.g., 122g) may be defined by four corners (e.g., A1, B1, C1 and D1).

The warp correction units generally fetch fixed-size tiles from the corresponding image buffers (e.g., image buffer 102, image buffer 106). The warp correction units may generate fixed-size intermediate tiles and fixed-size output tiles. For example, the vertical warp correction unit may (i) fetch intermediate tiles having a size of 64 rows by 8 columns and (ii) generate output tiles having a size of 16 rows by 8 columns. Furthermore, the horizontal warp correction unit generally (i) fetches input tiles having a size of 1 row by 6 columns and (ii) generate intermediate tiles having a size of 1 row by 1 column (e.g., a single intermediate pixel).

Figure 3:
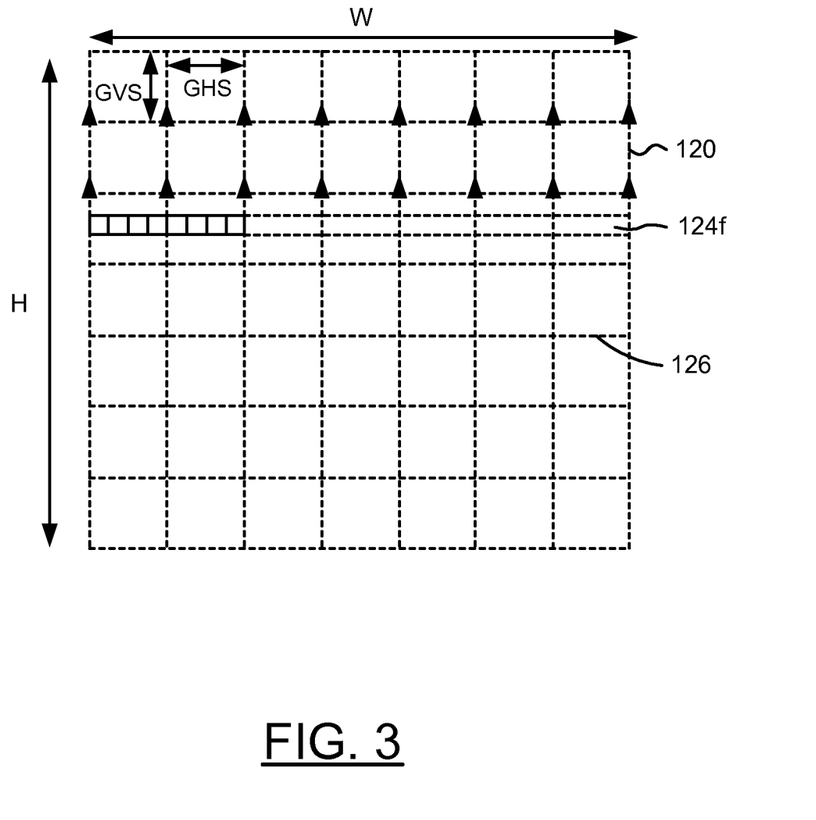
FIG. 3 is a diagram of a rectangular grid superimposed on an output image.

Referring to FIG. 3, a diagram of a rectangular grid 126 superimposed on an output image (e.g., 120) is shown. The row 124f of output tiles is also shown. The output tiles may be generated in a raster scan order.

A grid field is generally specified at the crossing points of the grid 126 and stored in a single-port memory. The single-port memory may have only a single x-bit wide data port. An address to the single-port memory is generally a number formed by a concatenating a grid row value (e.g., GRIDROW) and a grid column value (e.g., GRIDCOL) such that the address accesses data at {GRIDROW, GRIDCOL}.

The value GRIDROW value may be stored in an n-bit register. A value of $2^n$ is generally designed to be greater than or equal to a maximum number of grid rows in the grid 126. The value GRIDCOL may be stored in an m-bit register. A value $2^m$ is generally designed to be greater than or equal to a maximum number of grid columns in the grid 126. A grid spacing value (e.g., GHS) of the grid 126 may refer to a grid spacing in the horizontal direction. A grid spacing value (e.g., GVS) of the grid 126 generally refers to a grid spacing in the vertical direction. The value GHS may be an integer fraction of the width of the output tiles. The value GVS may be another integer fraction of the height of the output tiles.

Figure 4:
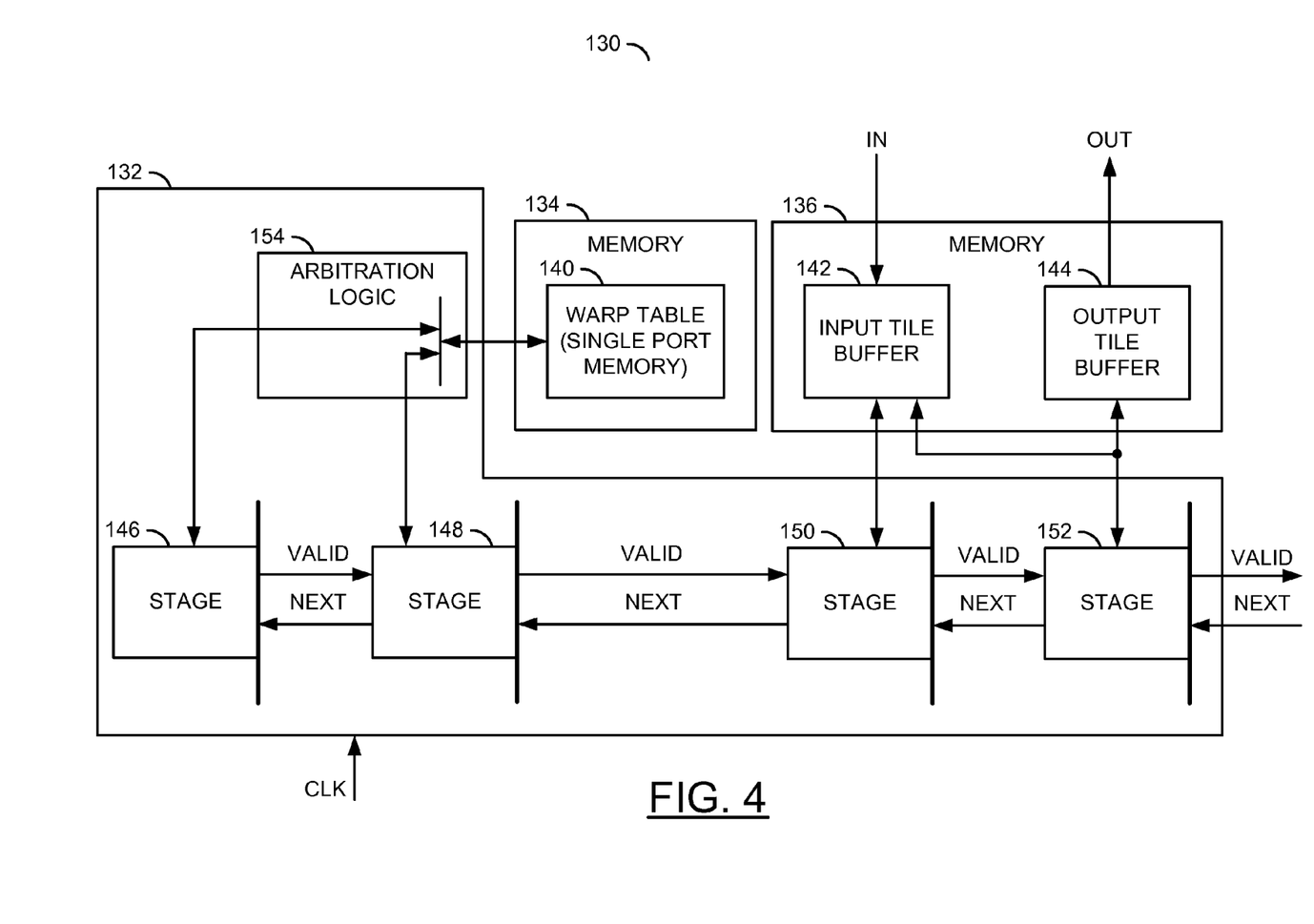
FIG. 4 is a block diagram of an apparatus in accordance with a preferred embodiment of the present invention.

Referring to FIG. 4, a block diagram of an apparatus 130 is shown in accordance with a preferred embodiment of the present invention. The apparatus (or device) 130 generally comprises a circuit (or module) 132, a circuit (or module) 134 and a circuit (or module) 136. The signal IN may be received by the circuit 136. The signal OUT may be generated and presented by the circuit 136. A clock signal (e.g., CLK) may be received by the circuit 132. The circuits 132-136 may be implemented in hardware, software, firmware or any combination thereof in an apparatus. In some embodiments, the apparatus 130 may be a digital video camera, a digital still camera or a hybrid digital video/still camera.

The circuit 132 may implement a pipelined processor circuit. The circuit 132 is generally operational to generate an output image by a warp correction of an input image. Warp correction may be defined by multiple values stored in a warp table. The warp correction may include a directional warp correction along an initial direction (e.g., horizontal direction) of the input image to create an intermediate image. The warp correction may also include another directional warp correction along a different direction (e.g., vertical direction) of the intermediate image to create the output image.

The circuit 134 may implement a single-port memory circuit. The circuit 134 may be operational to store the warp table 140 used by the circuit 132. The circuit 134 generally has a single x-bit wide data port, a single y-bit wide address port and corresponding command and control interfaces. In some embodiments, the circuit 134 may implement a non-volatile memory. In other embodiments, the circuit 134 may implement a volatile memory with the warp table 140 being loaded at power up and/or reset. In still other embodiments, the circuit 134 may implement a multi-port memory with a single port being utilized in a design of the circuit 130. The circuit 134 may be fabricated either on (in) a same die as the circuit 132 or on (in) a separate die from the circuit 132.

The circuit 136 may implement one or more memory circuits. The circuit 136 may be operational to establish an input tile buffer 142 and an output tile buffer 144 in different addressable areas. In some embodiments, the circuit 136 may comprise two or more memories with the buffer 142 residing in one memory circuit and the buffer 144 residing in another memory circuit. The circuit 136 may be fabricated either on (in) a same die as the circuit 132 or on (in) a separate die from the circuit 132. The circuit 136 may also be fabricated either on (in) a same die as the circuit 134 or on (in) a separate die from the circuit 134.

The circuit 132 generally comprises a circuit (or module) 146, a circuit (or module) 148, a circuit (or module) 150, a circuit (or module) 152 and a circuit (or module) 154. The circuits 146 and 148 may bidirectionally communicate with the circuit 154. The circuit 154 may bidirectionally communicate with the circuit 134 to access the warp table 140. The circuit 150 may bidirectionally communicate with the circuit 136 to access the buffer 142. The circuit 152 may bidirectionally communicate with the circuit 136 to access the buffer 142 and the buffer 144. The circuits 146-154 are generally arranged in a pipeline fashion such that each circuit 146-152 is in bidirectional communication with a neighboring circuit 146-152. In some embodiments, additional pipelined circuits may be included in the circuit 132 at the output-end of the circuit 152.

The circuit 146 may implement a stage of the pipeline. The circuit 146 is generally operational to fetch a portion of the warp table 140 from the circuit 134 corresponding to a current tile row being analyzed. The circuit 146 may also generate a minimum warp field across the current tile row in the output image utilizing the warp table 140. Generally, the circuit 146 may calculate warp fields at the top-left point of the tile row using one-dimensional interpolation. The one-dimensional interpolation may be repeated at incremental points along the top line at every vertical grid crossing. The above approach may result in reading at most two table entries from the warp table 140 per grid spacing. The minimum warp field may be passed to the circuit 148.

The circuit 148 may implement another stage of the pipeline. The circuit 148 is generally operational to fetch a portion of the warp table 140 from the circuit 134 corresponding to the current tile row. The circuit 148 may also generate multiple interpolation parameters of the tile row based on the warp table 140. The interpolation parameters and the minimum warp field may be passed to the circuit 150.

The circuit 150 may implement another stage of the pipeline. The circuit 150 is generally operational to fetch an input tile of an input image into the buffer 142. The fetching may be based on the interpolation parameters generated by the circuit 148 and the minimum warp field generated by the circuit 146. The circuit 150 is also operational to generate multiple phasing parameters corresponding to the input tile. The interpolation parameters, minimum warp field and phasing parameters may be transferred to the circuit 152.

The circuit 152 may implement another stage of the pipeline. The circuit 152 is generally operational to fetch several neighboring input pixels from the buffer 142. The circuit 152 may generate output tiles in the tile row of the output image based on the interpolation parameters, the phasing parameters and the input tile. The output tiles may be written to the buffer 144 for subsequent use in other parts of the apparatus 130.

The circuit 154 may implement an arbitrator circuit. The circuit 154 is generally operational to perform arbitration between the circuits 146 and 148 for access to the circuit 134 and the warp table 140 therein. In some embodiments, the circuit 154 may be formed external to the circuit 132.

When information generated by a particular circuit 146-152 is ready, the particular circuit 146-152 may assert a signal (e.g., VALID) to the next neighboring circuit 148-152 in the pipeline. A signal (e.g., NEXT) may be generated by the next neighboring circuit 148-152 when ready for more information, the signal NEXT may be transferred back to the previous neighboring circuit 146-152. The information may be transferred from a one circuit (e.g., circuit 148) to another circuit (e.g., circuit 150) when both the signal VALID and the signal NEXT between the neighboring circuits are asserted in the same clock cycle of the signal CLK. Once the information has been transferred, the information may be latched locally in the receiving circuit 148-152 and used in the next computations of the stage.

The circuits 146 and 148 may arbitrate for access to warp table 140. The circuit 154 may perform the arbitration. In some embodiments, the arbitration scheme may be a priority arbitration with a highest priority to the circuit 148. If the circuit 148 is trying to access the circuit 134, the circuit 148 is generally granted access in the same cycle. If the circuit 148 is not requesting access and the circuit 146 is requesting access, access may be granted to the circuit 146. Accesses to the warp table 140 from the circuit 146 and the circuit 148 may be time multiplexed with circuit 148 having higher priority. Other arbitration schemes may be implemented to meet the criteria of a particular application.

The following definitions are generally used in the descriptions below:

OUT_TILE_HEIGHT: Height of the output tile in units of pixels;

OUT_TILE_WIDTH: Width of the output tile in units of pixels;

GHS: Horizontal grid spacing in units of pixels;

GVS: Vertical grid spacing in units of pixels;

GVS_: GVS/OUT_TILE_HEIGHT;

FILTERTAPS: Number of taps of a Finite Impulse Response (FIR) filter used for generating the output pixels.

Figure 5:
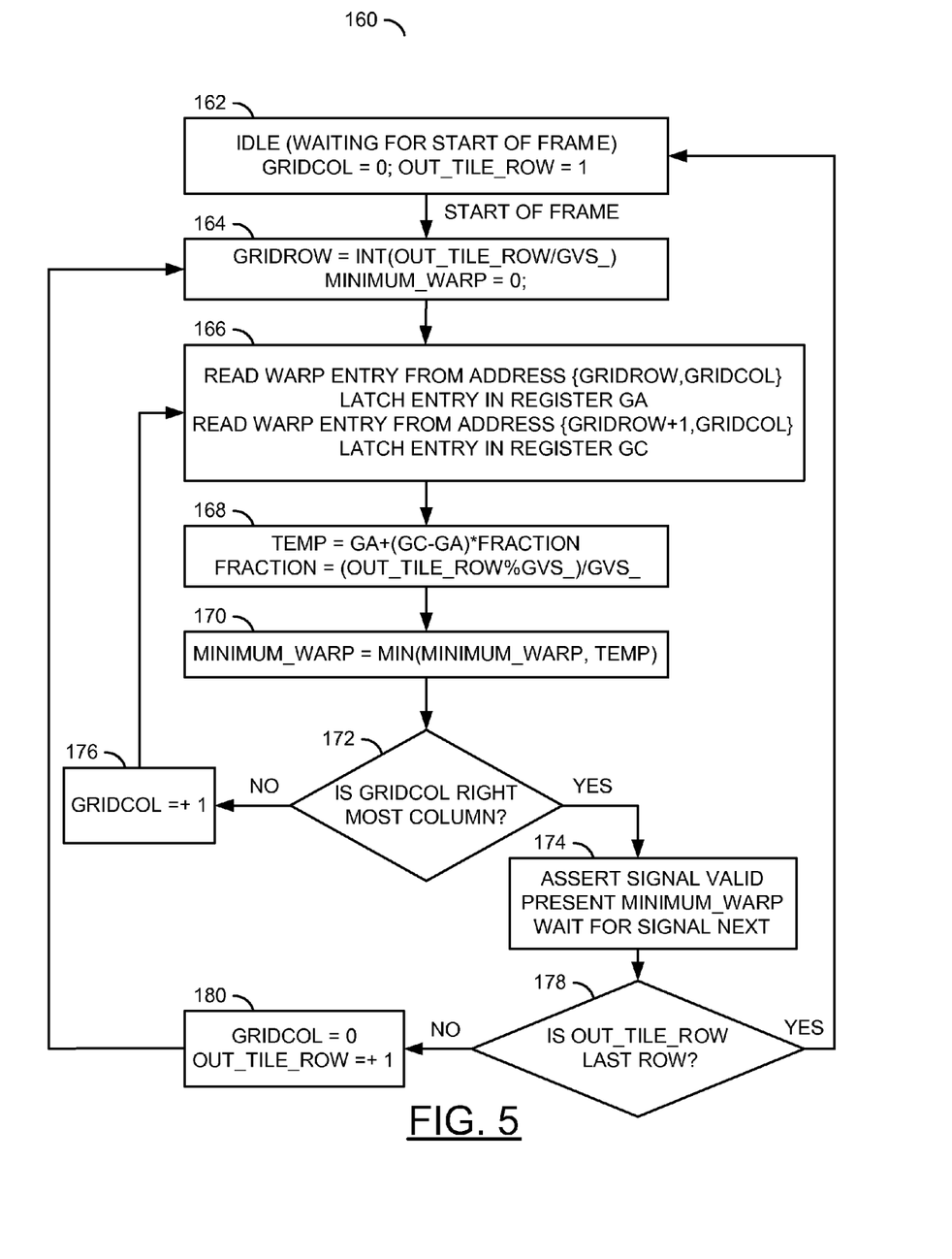
FIG. 5 is a flow diagram of an example method for calculating a minimum warp field.

Referring to FIG. 5, a flow diagram of an example method 160 for calculating the minimum warp field is shown. The method (or process) 160 may be implemented by the circuit 146. The method 160 generally comprises a step (or block) 162, a step (or block) 164, a step (or block) 166, a step (or block) 168, a step (or block) 170, a step (or block) 172, a step (or block) 174, a step (or block) 176, a step (or block) 178 and a step (or block) 180. The steps 162 to 180 may be implemented in hardware, software, firmware or any combination thereof in an apparatus.

The circuit 146 generally comprises multiple internal registers. A register (e.g., OUT_TILE_ROW) may point to a current row of a current output tile. Another register (e.g., GRIDCOL) may point to a current grid column. Another register (e.g., GA) may store a warp value read from the warp table 140. A register (e.g., GC) may store another warp value read from the warp table 140. A register (e.g., MINIMUM_WARP) may store the minimum warp field value. The circuit 146 may calculate the minimum warp field value across a next output tile row and transfer the minimum warp field value to the circuit 148. The computation generally occurs once for each output tile row.

On power up and/or reset, (i) the value GRIDCOL may be initialized (e.g., GRIDCOL=0), (ii) the value OUT_TILE_ROW may be initialized (e.g., OUT_TILE_ROW=1) and (iii) the circuit 146 may wait for a start of frame in the step 162. The register GRIDCOL and the register OUT_TILE_ROW may be used as local counters. The start of frame is generally a software mechanism used to start hardware processing. In the step 164, the circuit 146 may (i) compute GRIDROW=integer (OUT_TILE_ROW/GVS_) and (ii) clear the value MINIMUM_WARP (e.g., MINIMUM_WARP=0).

In the step 166, the circuit 146 may (i) form an address by concatenating the value GRIDROW and the value GRIDCOL (e.g., ADDRESS={GRIDROW, GRIDCOL}), (ii) read the warp table 140 at the address and (iii) latch the read data into the register GA. The step 166 may include (i) generating another address by concatenating the values GRIDROW+1 and GRIDCOL (e.g., ADDRESS={GRIDROW+1,GRIDCOL}), (ii) reading the warp table 140 at the address and (iii) latching the read data into the register GC. In the step 168, the circuit 146 generally computes a temporary value (e.g., TEMP) as TEMP=GA+(GC−GA)*FRACTION, where FRACTION=(OUT_TILE_ROW % GVS_)/GVS_. The function x % y may be a modulus function that returns the remainder of x divided by y. The circuit 146 may compute MINIMUM_WARP=min(MINIMUM_WARP, TEMP) in the step 170, where min(a,b)=if(a<b)?a:b. The function x?y:z generally means that if x is true, return the value y, else return the value z.

A check may be performed in the step 172 to determine if the value GRIDCOL is that of the rightmost column of the output image. If true (e.g., the YES branch of step 172), (i) the signal VALID may be asserted in the step 174, (ii) the value MINIMUM_WARP may be presented to the circuit 148 and (iii) the circuit 146 waits for the signal NEXT to be activated by the circuit 148. If false (e.g., the NO branch of step 172), the GRIDCOL counter may be incremented in the step 176 and the method 160 returns to the step 166.

Once the signal NEXT has been asserted by the circuit 148, a check may be performed in the step 178 to determine if the value OUT_TILE_ROW is that of the last row of the output image. If the check is true (e.g., the YES branch of step 178), the method 160 may return to the step 162 and wait for the next start of frame. If false (e.g., the NO branch of step 178), the value GRIDCOL may be cleared (e.g., GRIDCOL=0) and the value OUT_TILE_ROW may be incremented in the step 180. The method 160 generally returns from the step 180 to the step 164.

Figure 6:
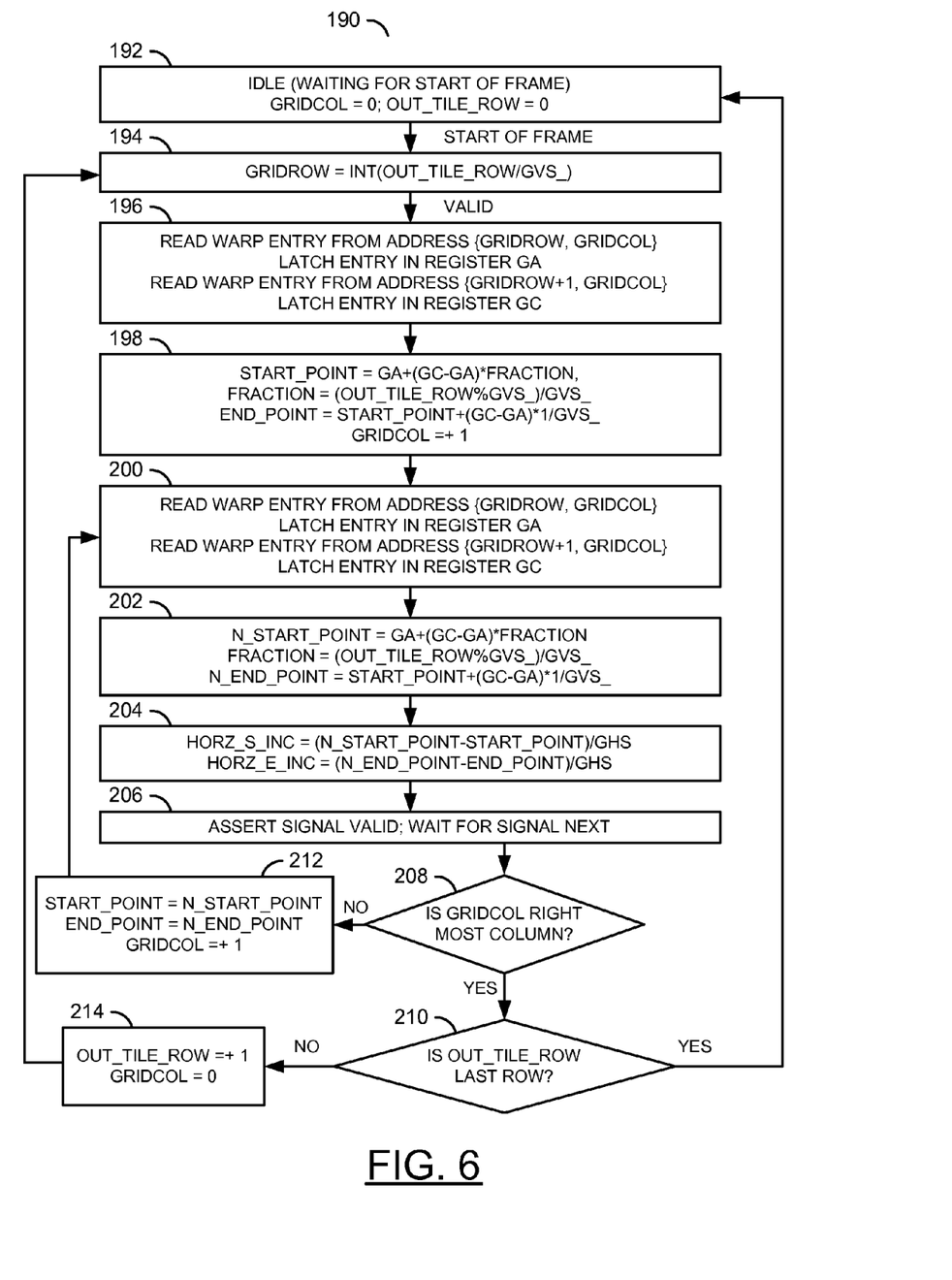
FIG. 6 is a flow diagram of an example method for calculating interpolation parameters.

Referring to FIG. 6, a flow diagram of an example method 190 for calculating the interpolation parameters is shown. The method (or process) 190 may be implemented by the circuit 148. The method 190 generally comprises a step (or block) 192, a step (or block) 194, a step (or block) 196, a step (or block) 198, a step (or block) 200, a step (or block) 202, a step (or block) 204, a step (or block) 206, a step (or block) 208, a step (or block) 210, a step (or block) 212 and a step (or block) 214. The steps 192 to 214 may be implemented in hardware, software, firmware or any combination thereof in an apparatus.

The circuit 148 generally comprises multiple internal registers similar to the internal registers of the circuit 146. The register OUT_TILE_ROW may point to a current row of a current output tile. The register GRIDCOL may point to a current grid column. The register GA may store a warp value read from the warp table 140. The register GC may store another warp value read from the warp table 140. The register MINIMUM_WARP may store the minimum warp field value. The circuit 148 may calculate value for multiple interpolation parameters and transfer the values to the circuit 150.

Figure 7:
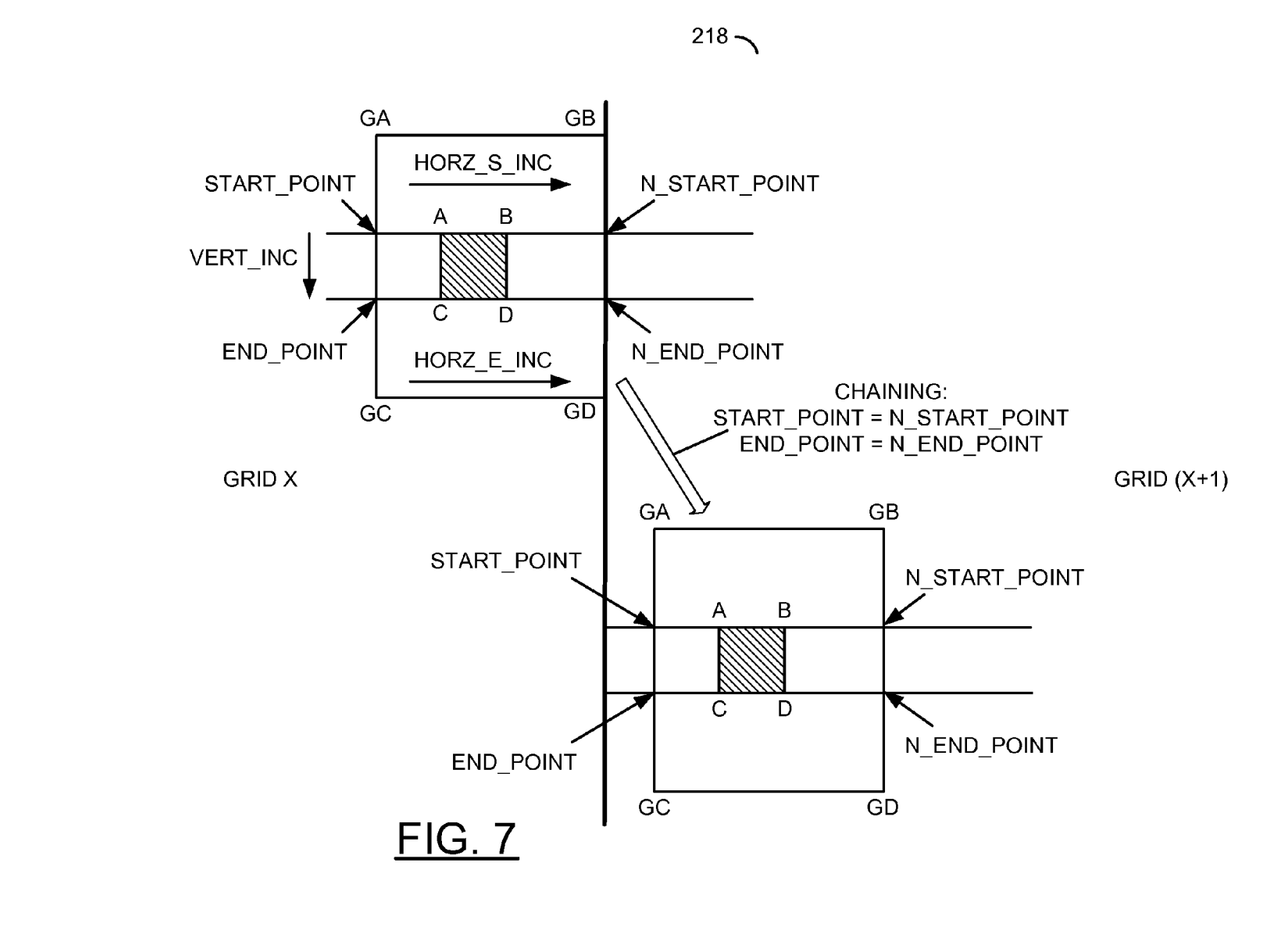
FIG. 7 is a diagram of the interpolation parameters and a chaining operation when crossing a grid boundary.

Referring to FIG. 7, a diagram 218 of the interpolation parameters and the chaining operation when crossing a grid boundary (e.g., going from grid X to grid (X+1)) is shown. The circuit 148 is generally operational to compute the interpolation parameters. When a grid boundary is crossed, the circuit 148 may chain the interpolation parameters. The circuit 148 may (i) transfer a N_START_POINT parameter (e.g., warp field at top right corner) into a START_POINT parameter (e.g., warp field at top left corner), (ii) transfer a N_END_POINT parameter (e.g., warp field at bottom right corner) into an END_POINT parameter (e.g., warp field at bottom left corner) and (iii) compute the N_START_POINT parameter and the N_END_POINT parameter for the next grid. The interpolation parameters may include, but are not limited to (i) the START_POINT parameter, (ii) the END_POINT parameter, (iii) the N_START_POINT parameter, (iv) the N_END_POINT parameter, (v) a HORZ_S_INC parameter (e.g., increment along top pixel line) and (vi) a HORZ_E_INC parameter (e.g., increment along bottom pixel line) as illustrated.

Returning to FIG. 6, on power up and/or reset, the circuit 148 may (i) initialize the value GRIDCOL (e.g., GRIDCOL=0) and (ii) initialize the OUT_TILE_ROW (e.g., OUT_TILE_ROW=0) in the step 192. The register GRIDCOL and the register OUT_TILE_ROW may be used as local counters. Upon receiving the start of frame, the circuit 148 may compute the value GRIDROW as GRIDROW=integer(OUT_TILE_ROW/GVS_) and wait for the signal VALID to be asserted by the circuit 146 in the step 194.

When the signal VALID is asserted by the circuit 146, the circuit 148 may (i) latch the value MINIMUM_WARP in a local register in the step 196, (ii) generate an address by concatenation of GRIDROW and GRIDCOL (e.g., ADDRESS={GRIDROW,GRIDCOL}), (iii) read the warp table 140 from the address and (iv) latch the read data into the register GA. In the step 196 may also include (i) forming another address by concatenation of the values GRIDROW+1 and GRIDCOL (e.g., ADDRESS={GRIDROW+1,GRIDCOL}), (ii) read data from the warp table 140 from the address and (iii) latch the read data into register GC.

In the step 198, the circuit 148 may compute (i) START_POINT=GA+(GC−GA)*FRACTION, where FRACTION=(OUT_TILE_ROW % GVS_)/GVS_, (ii) END_POINT=START_POINT+(GC−GA)*FRACTION where FRACTION=1/GVS_and (iii) increment the value GRIDCOL (e.g., GRIDCOL=+1). The circuit 148 may use the step 200 to (i) form an address by concatenating the values GRIDROW and GRIDCOL (e.g., ADDRESS={GRIDROW,GRIDCOL}), (ii) read the warp table 140 from the address and (iii) latch the read the read data into register GA. The step 200 may also include (i) forming another address by concatenating the values GRIDROW+1 and GRIDCOL (e.g., ADDRESS={GRIDROW+1,GRIDCOL}), (ii) read the warp table 140 from address and (iii) latch the read data into register GC.

In the step 202, the circuit 148 may compute (i) N_START_POINT=GA+(GC−GA)*FRACTION, where FRACTION=(OUT_TILE_ROW % GVS_)/GVS_and (ii) N_END_POINT=N_START_POINT+(GC−GA)*FRACTION, where FRACTION=1/GVS_. The circuit 148 may compute (i) an increment along the top horizontal line (e.g., HORZ_S_INC=(N_START_POINT−START_POINT)/GHS, where the value GHS is horizontal grid spacing in units of pixels) in the step 204 and (ii) an increment along the bottom horizontal line (e.g., HORZ_E_INC=(N_END_POINT−END_POINT)/GHS.

In the step 206, the signal VALID may be asserted to the circuit 150 and the circuit 148 may wait for the signal NEXT to be asserted by the circuit 150. Once the signal NEXT has been asserted by the circuit 150, the circuit 148 may check to determine if the value GRIDCOL is that of the rightmost column of the image in the step 208. If true (e.g., the YES branch of step 208), the circuit 148 may check in the step 210 to determine if the value OUT_TILE_ROW is that of the last row. If the check in the step 208 is false (e.g., the NO branch of step 208), the circuit 148 may (i) move the value N_START_POINT into the value START_POINT, (ii) move the value N_END_POINT into the value END_POINT, (iii) increment the value GRIDCOL in the step 212 and proceed to the step 200.

If the value OUT_TILE_ROW is that of the last row of the image (e.g., the YES branch of step 210), the process may return to step 192 and wait for the next start of frame. If the check is false (e.g., the NO branch of step 210), the circuit 148 may (i) increment the value OUT_TILE_ROW by one, (ii) clear the value GRIDCOL (e.g., GRIDCOL=0) and return to the step 194.

Figure 8:
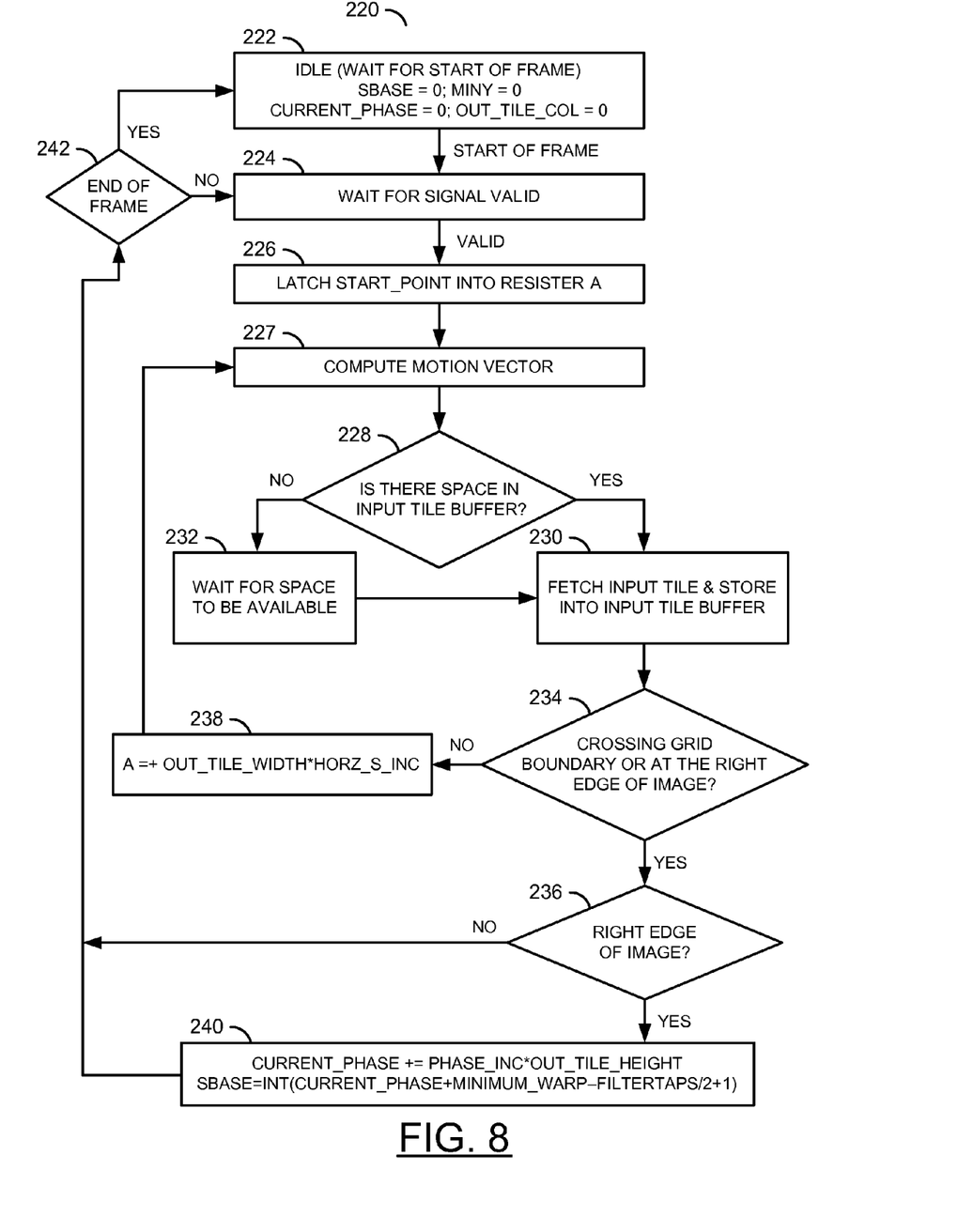
FIG. 8 is a flow diagram of an example method for calculating a motion vector and fetching an input tile.

Referring to FIG. 8, a flow diagram of an example method 220 for calculating a motion vector and fetching an input tile is shown. The method (or process) 220 may be implemented by the circuit 150. The method 220 generally comprises a step (or block) 222, a step (or block) 224, a step (or block) 226, a step (or block) 227, a step (or block) 228, a step (or block) 230, a step (or block) 232, a step (or block) 234, a step (or block) 236, a step (or block) 238, a step (or block) 240 and a step (or block) 242. The steps 222 to 242 may be implemented in hardware, software, firmware or any combination thereof in an apparatus.

The circuit 150 may be operational to fetch input tiles into the buffer 142. Once a complete input tile is in the buffers local to the circuit 150, the signal VALID may be asserted to the circuit 152. The circuit 150 generally comprises multiple internal registers. A pair of registers (e.g., A and B) may be used to store intermediate calculated values. A register (e.g., CURRENT_PHASE) may store a pointer into the input picture. For an output pixel line N, a value of CURRENT_PHASE may be N*PHASE_INC. A register (e.g., SBASE) may store an address of the initial row stored in the image buffer 102, image buffer 106. The address may refer to the input picture. An address=0 may be an initial row of the input picture. The register MINIMUM_WARP may store the value of the minimum warp field. A register (e.g., ZERO_POINT) may store an address of an initial row of an input tile in the buffer 142. A register (e.g., MV) may store an offset address into the image buffer 102, image buffer 106. MV=(row=0, column=0) generally means an initial row and an initial column in the image buffer 102, image buffer 106. A register (e.g., OUT_TILE_WIDTH) may store the width of the output tiles. The circuit 150 may calculate values for multiple phasing parameters and transfer the phasing parameter values, the interpolation values and the value MINIMUM_WARP to the circuit 152. The phasing parameters may include, but are not limited to, the value CURRENT_PHASE and the value ZERO_POINT. The values in the registers CURRENT_PHASE and SBASE may be used to compute the value in the register MV, which is an address into the image buffer 102, image buffer 106. The values in the registers CURRENT_PHASE and ZERO_POINT are generally used to compute the address into the buffer 142.

On power up and/or reset, the circuit 150 may (i) clear the register SBASE (e.g., SBASE=0), the register CURRENT_PHASE (e.g., CURRENT_PHASE=0), the register MINY (e.g., MINY=0) and the register OUT_TILE_COL (e.g., OUT_TILE_COL=0) in the step 222. Upon receipt of the start of frame, the circuit 150 may wait for the circuit 148 to assert the signal VALID in the step 224.

Once the signal VALID has been asserted by the circuit 148, the circuit 150 may latch the values START_POINT, END_POINT, HORZ_S_INC, HORZ_E_INC and MINIMUM_WARP in the step 226 as received from the circuit 148. In step 227, the circuit 150 may compute a motion vector (e.g., MV) as:

1. B=A+(OUT_TILE_WIDTH−1)*HORZ_S_INC
    2. ZERO_POINT=CURRENT_PHASE+min(A, B)+1−FILTERTAPS/2
    3. MV=ZERO_POINT-SBASE A check may be performed in the step 228 to determine if space is available in the buffer 142 to hold a complete new input tile. If space is available (e.g., the YES branch of step 218), the circuit may fetch the new input tile into the buffer 142 in the step 230 from an ADDRESS (X,Y)=(OUT_TILE_COL,MV) of the image buffer 102, image buffer 106. If insufficient space is available (e.g., the NO branch of step 228), the circuit 150 may wait in the step 232 for space to become available, then fetch the new input tile in the step 230.

A check may be performed in the step 234 to determine if a grid boundary crossing is in progress. If the condition is true (e.g., the YES branch of step 234), another check may be made in the step 236. If the condition is false (e.g., the NO branch of step 234), the circuit 150 may calculate A=+OUT_TILE_WIDTH*HORZ_S_INC in the step 238 and return to the step 227.

The step 236 may determine if the right edge of the image has been reached. If false (e.g., the NO branch of step 236), the method 220 may proceed to the step 242. If true (e.g., the YES branch of step 236), the circuit 150 may calculate CURRENT_PHASE=+PHASE_INC*OUT_TILE_HEIGHT in the step 240, where PHASE_INC may be programmable from (0,1]. When the value PHASE_INC is programmed less than 1, an up-sampling may be achieved as well as warping. If the value PHASE_INC is programmed with 1, a warping may be achieved without up-sampling. The step 240 may also set SBASE=integer(CURRENT_PHASE+MINIMUM_WARP−FILTERTAPS/2+1). Thereafter, the method 220 may proceed to the step 242.

A check may be made in the step 242 to determine if an end of frame has been reached. If the end of frame has been reached (e.g., the YES branch of step 242), the method 220 may return to step 222 and wait for a next start of frame. If no end of frame has been reached (e.g., the No branch of step 242), the method 220 may return to the step 224 and wait for the circuit 148 to assert the signal VALID.

Figure 9:
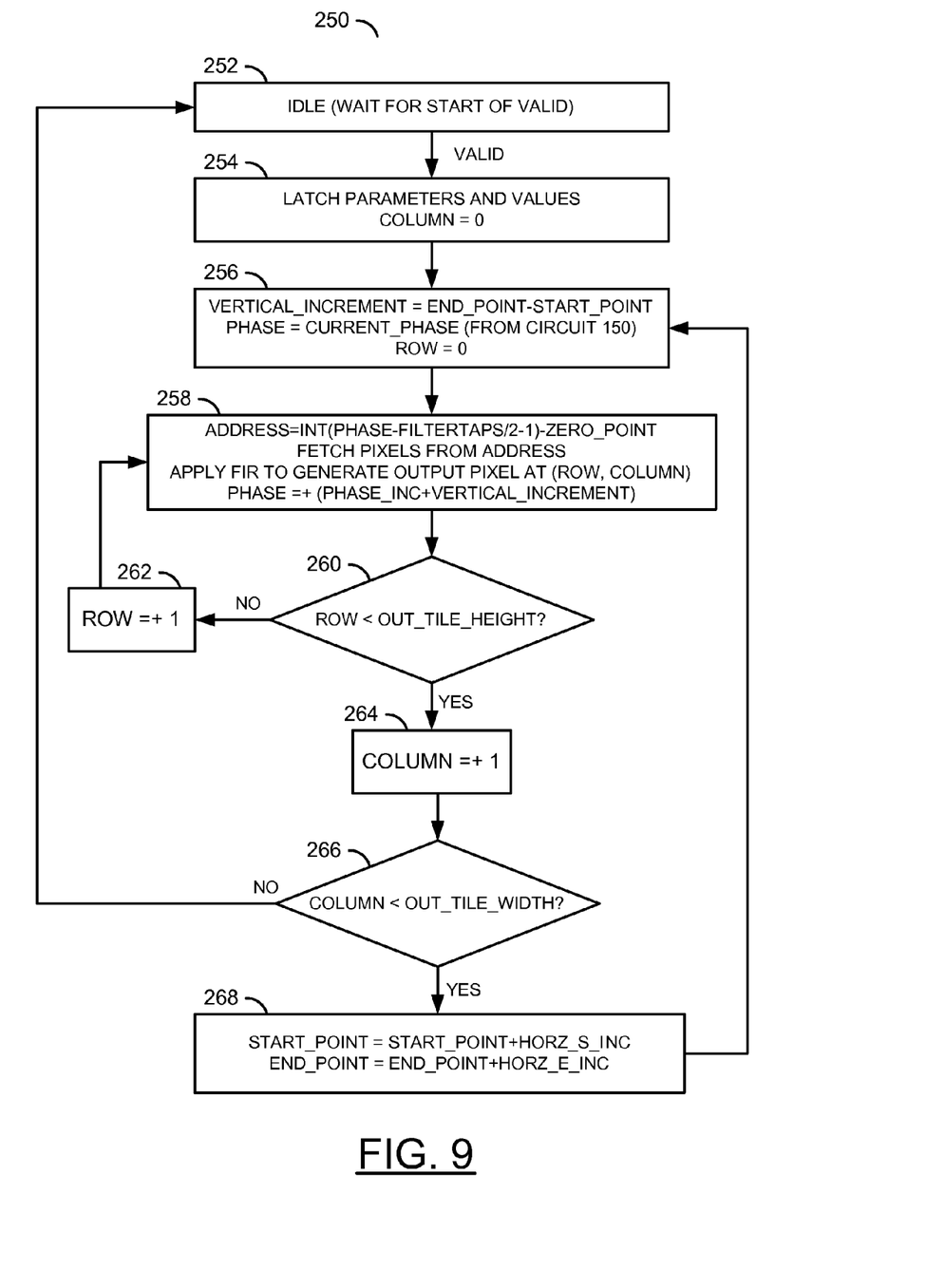
FIG. 9 is a flow diagram of an example method for calculating the output pixels.

Referring to FIG. 9, a flow diagram of an example method 250 for calculating the output pixels is shown. The method (or process) 250 may be implemented by the circuit 152. The method 250 generally comprises a step (or block) 252, a step (or block) 254, a step (or block) 256, a step (or block) 258, a step (or block) 260, a step (or block) 262, a step (or block) 264, a step (or block) 266 and a step (or block) 268. The steps 252 to 268 may be implemented in hardware, software, firmware or any combination thereof in an apparatus.

The circuit 152 may be operational to fetch pixels from the buffer 142, generate the output pixels and store the output pixels in the buffer 144. Generation of the output tiles may be performed in inverse raster scan order. Once a complete output tile is written to the buffer 144, the output tile may be sent to either a next camera block in the pipeline of the circuit 132 and/or stored to an external memory for display/modification later.

On power up and/or reset, the circuit 152 may clear the local registers in the step 252 and wait for the signal VALID to be asserted by the circuit 150. Once the signal VALID is asserted, the circuit 152 may (i) latch into the local registers the values CURRENT_PHASE, ZERO_POINT, END_POINT, START_POINT, HORZ_S_INC and HORZ_E_INC as received from the circuit 150 and (ii) initialize a column counter (e.g., COLUMN=0) in the step 254. In the step 256, the circuit 152 may (i) compute a vertical increment (e.g., VERTICAL_INCREMENT) as VERTICAL_INCREMENT=END_POINT−START_POINT, (ii) compute PHASE=CURRENT_PHASE (e.g., the CURRENT_PHASE received from the circuit 150) and (iii) initialize a row counter (e.g., ROW=0). In the step 258, the circuit 152 may fetch input pixels from the buffer 142 starting from an ADDRESS=integer(PHASE−FILTERTAPS/2−1)−ZERO_POINT. The number of pixels fetched generally depends upon the filter values (e.g., FILTERTAPS) of the FIR filter. The step 258 may include (i) applying the FIR filtering on the fetched input pixels to generate an output pixel at a point (ROW,COLUMN) in the output tile and (ii) computing PHASE=+(PHASE_INC+VERTICAL_INCREMENT).

A check may be performed by the circuit 152 in the step 260 to determine if the counter ROW is less than the value OUT_TILE_HEIGHT. If counter ROW is less (e.g., the NO branch of step 260), the counter ROW may be incremented in the step 262 and the method 250 returns to the step 258 to calculate the next output pixel. Once the counter ROW reaches the value OUT_TILE_HEIGHT (e.g., the NO branch of step 260), the counter COLUMN may be incremented in the step 264.

A check may be performed in the step 266 to determine if the counter COLUMN is less than the value OUT_TILE_WIDTH. If the counter COLUMN is less (e.g., the YES branch of step 266), the circuit 152 may (i) compute START_POINT=START_POINT+HORZ_S_INC and (ii) END_POINT=END_POINT+HORZ_E_INC in the step 268. Thereafter, the method 250 may return to the step 256 to work on the next output column. Once the counter COLUMN reaches the value OUT_TILE_WIDTH (e.g., the NO branch of step 266), the method 250 may return to the step 252 and wait for the signal VALID to be come active again The functions performed by the diagrams of FIGS. 1, 4, 6, 8 and 9 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    a first memory configured to store a warp table, wherein said warp table is accessed through a single data port of said first memory;
    a second memory configured to buffer an input image, wherein said input image comprises a plurality of input pixels arranged in two dimensions; and
    a circuit configured to (a) generate an output image by a warp correction of said input image and (b) generate a plurality of first parameters of a tile row in said output image based on said warp table, wherein (i) said warp correction is defined by said warp table, (ii) said output image comprises a plurality of output pixels and (iii) at least one of said output pixels is generated during each one of a plurality of clock cycles of said circuit.

2. The apparatus according to claim 1, wherein said circuit is further configured to generate an intermediate image by said warp correction of said input image in a first of said dimensions.

3. The apparatus according to claim 2, wherein said circuit is further configured to generate said output image by said warp correction of said intermediate image in a second of said dimensions.

4. The apparatus according to claim 1, wherein said circuit is further configured to generate a minimum warp field across said tile row in said output image utilizing said warp table.

5. The apparatus according to claim 4, wherein said circuit is further configured to arbitrate access to said warp table between said generation of said minimum warp field and said generation of said first parameters.

6. The apparatus according to claim 1, wherein (i) said tile row comprises a plurality of output tiles and (ii) each of said output tiles comprises a subset of said output pixels.

7. The apparatus according to claim 1, wherein said circuit is further configured to (i) fetch an input tile from said input image based on said first parameters, said input tile comprising a subset of said input pixels, and (ii) generate a plurality of second parameters corresponding to said input tile.

8. The apparatus according to claim 7, wherein said circuit is further configured to generate an output tile in said tile row based on (i) said input tile, (ii) said first parameters and (iii) said second parameters.

9. The apparatus according to claim 1, wherein said circuit forms part of a camera.

10. A method for warp correction in an input image, comprising the steps of:
    (A) storing a warp table in a memory, wherein said warp table is accessed through a single data port of said memory;
    (B) buffering said input image, wherein said input image comprises a plurality of input pixels arranged in two dimensions;
    (C) generating an output image by warp correcting said input image using a circuit, wherein (i) said warp correcting is defined by said warp table, (ii) said output image comprises a plurality of output pixels and (iii) at least one of said output pixels is generated during each one of a plurality of clock cycles of said circuit; and (D) generating a plurality of first parameters of a tile row in said output image based on said warp table.

11. The method according to claim 10, wherein said generating of said output image comprises generating an intermediate image by said warp correcting of said input image in a first of said dimensions.

12. The method according to claim 11, wherein said generating of said output image further comprises said warp correcting of said intermediate image in a second of said dimensions.

13. The method according to claim 10, wherein said generating of said output image further comprises:
    calculating from said warp table a plurality of parameters corresponding to a plurality of rows of said output image; and
    calculating said output pixels in said rows by modifying said input pixels in said input image according to said parameters.

14. The method according to claim 10, wherein said warp correcting comprises:
    generating a minimum warp field across said tile row in said output image utilizing said warp table.

15. The method according to claim 14, further comprising the step of:
    arbitrating access to said warp table between said generating of said minimum warp field and said generating of said first parameters.

16. The method according to claim 10, wherein said warp correcting further comprises:
    fetching an input tile from said input image based on said first parameters; and
    generating a plurality of second parameters corresponding to said input tile.

17. The method according to claim 16, wherein said warp correcting further comprises generating an output tile in said tile row based on (i) said input tile, (ii) said first parameters and (iii) said second parameters.

18. A method for warp correction in an input image, comprising the steps of:
    (A) storing a warp table in a memory, wherein said warp table is accessed through a single data port of said memory;
    (B) buffering said input image, wherein said input image comprises a plurality of input pixels arranged in two dimensions;
    (C) generating an output image by warp correcting said input image using a circuit; and
    (D) generating a minimum warp field across a tile row in said output image utilizing said warp table, wherein (i) said warp correcting is defined by said warp table, (ii) said output image comprises a plurality of output pixels and (iii) at least one of said output pixels is generated during each one of a plurality of clock cycles of said circuit.

* * * * *